3,297,659
PROCESS FOR CROSS-LINKING UNSATURATED
HYDROCARBON POLYMERS
David S. Breslow and Arnold F. Marcantonio, Wilmington, Del., assignors to Hercules Incorporated, a corporation of Delaware
No Drawing. Filed Oct. 15, 1962, Ser. No. 230,699
2 Claims. (Cl. 260—79.3)

This application is a continuation-in-part of copending application Serial No. 209,228 filed July 11, 1962, now abandoned.

This invention relates to cross-linking hydrocarbon polymers and to the vulcanizates so produced. More particularly, the invention relates to cross-linking hydrocarbon polymers with aromatic polyazides and to the vulcanizates so produced.

In the past, industry has depended almost entirely upon sulfur or sulfur-bearing materials as vulcanizing, i.e., cross-linking agents. It has more recently been discovered that certain types of organic peroxides or azo compounds are capable of acting as vulcanizing agents. However, all of the above agents suffer the drawback that, because of their mode of action, they are not equally effective in cross-linking all types of polymers. For example, polybutadiene is effectively vulcanized by peroxides, while crystalline polypropylene is not.

Now, in accordance with this invention, it has unexpectedly been found that hydrocarbon polymers can be cross-linked with aromatic polyazides to produce vulcanizates that are tough, resilient, solvent-resistant and odor-free.

The aromatic polyazides useful in the present invention have the general formula $R(N_3)_x$ where R is an aromatic grouping inert to the cross-linking reaction, and $x$ is an integer greater than 1. Preferably $x$ will be an integer from 2 to 100 and R will be selected from the group of organic radicals consisting of arylene and alkarylene radicals. Exemplary of the aromatic polyazides useful in this invention are m-phenylene diazide, 2,4,6-triazidobenzene, 4,4'-diphenyl diazide, 4,4'-diphenylmethane diazide, 4,4'-diazidodiphenylamine, 4,4'-diazidodiphenylsulfone, 2,2'-dinitro-4,4'-diazidodiphenyl, 2,7-diazidonaphthalene and 2,6-diazidoanthraquinone. It will, of course, be obvious to those skilled in the art that still other aromatic polyazides containing functional groups, which are inert to cross-linking reactions, such as halogen, ester, azo, aldoxime, nitro, etc., groups, are included in the above definition. These functional groups will preferably be meta or para to the azido group so as not to hinder cross-linking activity. All of the aromatic polyazides are advantageous to use because of their relative insensitivity to impact, scorch resistance and because they have half-lives which can be varied with structural environment and can be used to cross-link at low temperature when irradiated.

The aromatic polyazides can be prepared in various ways, as for example, by diazotizing the corresponding aromatic amine and treating it with hydrazoic acid. The reaction can be shown by the following equation:

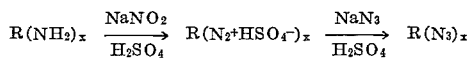

where R and $x$ are as defined above. The aromatic amines are well-known materials whose preparation is described in the chemical literature.

Any type of unsaturated hydrocarbon polymer, including linear, atactic, crystalline or nonlinear amorphous polymers, as for example, styrene-butadiene rubber, isobutylene-isoprene copolymer, natural rubber, polybutadiene, polyisobutylene, cis-1,4-polyisoprene, ethylene-propylene-dicyclopentadiene terpolymer, etc., and blends of these polymers with each other, can be cross-linked with any of the aromatic polyazides in accordance with this invention.

The cross-linking is carried out by heating the hydrocarbon polymer plus the aromatic polyazide above its decomposition temperature. The temperature at which cross-linking is effected can be varied over a wide range. In general, the temperature will vary from about 90° C. to about 300° C. Various amounts of cross-linking agent can be added, the optimum amount depending upon the amount of cross-linking desired, the specific aromatic polyazide employed, etc. In general, the amount added, based on the weight of the polymer, will be from about 0.001% to about 30%. In some cases, it may be desirable to add a small amount, i.e., from about 0.001% to about 5% of sulfur which seems to act as a co-agent for the aromatic polyazides.

The cross-linking agent can be incorporated in the polymer in a number of ways. For example, it can be uniformly blended by simply milling on a conventional rubber mill or dissolved in a solution containing the polymer. By either means, the aromatic polyazide is distributed throughout the polymer and uniform cross-linking is effected when the blend is subjected to heat. Other means of mixing the cross-linking agent with the polymer will be apparent to those skilled in the art.

In addition to the cross-linking agent, other ingredients can also be incorporated. The additives commonly used in rubber vulcanizates can be used here also, as for example, extenders, fillers, pigments, plasticizers, stabilizers, etc. Obviously, there are many cases in which other ingredients are not required or desired and excellent results are achieved when only the cross-linking agent is added.

The following examples are presented to illustrate the process of cross-linking polymers in accordance with this invention, parts and percentages being by weight unless otherwise specified. In some of the examples, the extent of cross-linking is determined by analysis for percent gain in insolubility in solvents in which the uncross-linked polymer was soluble and for the degree of swell therein, hereinafter termed "percent gel" and "percent swell." Percent gel is indicative of the percentage of polymer that is cross-linked and percent swell is inversely proportional to the cross-link density. Percent gel and swell are determined as follows: A weighed sample of cross-linked polymer is soaked in a solvent, in which the uncross-linked polymer was soluble, at an elevated temperature for a specified length of time. The sample is then removed, blotted on filter paper so as to remove the solvent on the surface and weighed at once. The swollen sample is then dried to constant weight. The weights of initial and final sample are corrected for polymer and copolymer content based on knowledge of compartments. From these figures $$\frac{\text{corrected dry weight}}{\text{corrected initial weight}} \times 100 = \text{percent gel}$$

$$\frac{\text{corrected swollen weight} - \text{corrected dry weight}}{\text{corrected dry weight}} \times 100 = \text{percent swell}$$

The molecular weight of the polymers cross-linked in the examples can be indicated by their Reduced Specific Viscosity (RSV). By the term "Reduced Specific Viscosity" is meant the $\eta_{sp}/C$ determined on an 0.1% solution (0.1 g. of the polymer per 100 ml. of solution) of the polymer at elevated temperature.

*Examples 1 and 2*

Samples of a styrene-butadiene copolymer containing styrene to butadiene in a ratio of 1 to 3 were cross-linked with different amounts of 4,4'-diphenyldiazide. Each sample was compounded with carbon black and diazide on a two-roll mill at a temperature of 65–95° C. for 10–15 minutes. The formulations are given below.

|  | Parts | |
| --- | --- | --- |
|  | 1 | 2 |
| Styrene-butadiene copolymer | 100 | 100 |
| High abrasion furnace black | 50 | 50 |
| 4,4'-diphenyldiazide | 6 | 1.5 |

Each formulation was heated in a closed iron mold at a temperature of 155° C. for 30 minutes. The resulting vulcanizates were tested and the results are shown in Table I.

|  | Examples | |
| --- | --- | --- |
|  | 1 | 2 |
| Tensile strength, p.s.i. | 2,710 | 2,300 |
| Modulus, 100% elongtion, p.s.i. | 900 | 310 |
| Elongation, percent | 190 | 500 |
| Percent gel * | 98 | 87 |
| Percent swell * | 210 | 580 |

\* Determined by extracting with a large excess of toluene at 80° C.

*Example 3*

To a carbon tetrachloride solution of the styrene-butadiene copolymer described in Examples 1 and 2 was added 5 parts per hundred parts of copolymer of 2,2'-dinitro-4,4'-diazidodiphenyl and the solvent was allowed to evaporate overnight at room temperature. The resulting mixture was then heated in a closed iron mold for one hour at a temperature of 160° C. The resulting vulcanizate was tested for percent gel and swell by extracting with a large excess of toluene at 80° C. The percent gel was 90 and the percent swell 949.

*Examples 4–6*

Samples of the styrene-butadiene copolymer described in Examples 1 and 2 were compounded with 50 parts per hundred of high abrasion furnace black and one part per hundred of 4,4'-diphenylmethane diazide on a two-roll mill at a temperature of 38–52° C. and then cured in closed iron molds at a temperature of 175° C. for different periods of time. The resulting vulcanizates were tested and the results are shown in Table II.

*Examples 7–9*

Samples of different polymers were cross-linked with 4,4'-diphenylmethane diazide. Each sample was compounded with 50 parts per hundred of high abrasion furnace black and 1 part per hundred of 4,4'-diphenylmethane diazide on a two-roll mill at a temperature of 27–66° C. for 20 minutes. Each formulation was then heated in a closed aluminum mold at a temperature of 175° C. The polymers cross-linked, the cross-linking time and the physical properties of the resulting vulcanizates are shown in Table III.

TABLE III

| Examples | Polymer | Cross-linking Time, min. | Modulus at 100% Elongation, p.s.i. | Tensile Strength, p.s.i. | Elongation, percent | Shore A2 Hardness | Break Set, percent |
| --- | --- | --- | --- | --- | --- | --- | --- |
| 7 | Cis-1,4-polyisoprene (containing 92.6% of the cis monomer). | 30 | 290 | 2,865 | 430 | 60 | 20 |
| 8 | Cis-1,4-polybutadiene (containing 91% of the cis monomer). | 15 | 555 | 2,240 | 235 | 57 | 20 |
| 9 | Natural rubber (smoked sheet) | 30 | 220 | 2,200 | 325 | 52 | 30 |

*Example 10*

A sample of isobutylene-isoprene copolymer (containing 2.25 mole percent of isoprene) was compounded with carbon black and 4,4'-diphenylmethane diazide exactly as described in Examples 7–9. The formulation was then heated in a closed aluminum mold at a temperature of 175° C. for 15 minutes. The resulting vulcanizate was insoluble in an excess of toluene at 80° C.

*Example 11*

A cross-linked solvent-resistant coating of styrene-butadiene copolymer (containing 85% by weight of styrene) was prepared as follows.

A sample of a copolymer was dissolved in toluene in an amount to make a 20% solution. To the solution was added an amount of ethylene dichloride solution of 4,4'-diphenylmethane diazide equivalent to 10% by weight of the diazide based on the copolymer. The resulting solution was sprayed on a glass plate and air dried for 2 hours at room temperature and 30 minutes at 100° C. The coated plate was then baked for one hour at a temperature of 150° C. The resulting coating was tested for solvent resistance by soaking in toluene. The cross-linked coating was insoluble while a coating prepared in the same way except for the omission of the aromatic diazide was soluble.

*Examples 12 and 13*

Two samples of an ethylene-propylene-dicyclopentadiene terpolymer having an RSV of 1.5 (determined in decahydronaphthalene at a temperature of 135° C.) and containing 39 weight percent of ethylene, 46 weight percent of propylene and 15 weight percent of dicyclopentadiene were cross-linked with 4,4'-diphenylmethane diazide. Each sample was compounded with carbon black and cross-linking ingredients on a two-roll mill at room

TABLE II

| Examples | Crosslinking Time, min. | Modulus at 300% Elongation, p.s.i. | Tensile Strength, p.s.i. | Elongation, percent | Shore A Hardness | Break Set, percent |
| --- | --- | --- | --- | --- | --- | --- |
| 4 | 30 | 2,300 | 3,080 | 370 | 61 | 10 |
| 5 | 60 | 2,650 | 3,290 | 350 | 61 | 10 |
| 6 | 90 | 2,750 | 3,275 | 360 | 60 | 10 | temperature for 20 minutes. The formulations are given below.

|  | Parts | |
|---|---|---|
|  | 12 | 13 |
| Ethylenepropylene dicyclopentadiene terpolymer | 100 | 100 |
| High abrasion furnace black | 50 | 50 |
| 4,4'diphenylmethane diazide | 22 | 2 |
| Polymerized trimethyl dihydroquinoline | 0.5 | 0.5 |
| Sulfur |  | 0.2 |

Each formulation was heated in a closed iron mold at a temperature of 170° C. for 30 minutes. The resulting vulcanizates were tested and the results are shown in Table IV.

TABLE IV

|  | Parts | |
|---|---|---|
|  | 12 | 13 |
| Modulus at 200% elongation, p.s.i | 1,885 | 1,810 |
| Tensile strength, p.s.i | 2,540 | 2,940 |
| Elongation at break, percent | 250 | 260 |
| Shore A Hardness | 67 | 69 |
| Break set, percent | 0 | 5 |

What we claim and desire to protect by Letters Patent is:

1. The process of cross-linking an unsaturated hydrocarbon polymer which comprises heating said polymer at a temperature of from about 90° C. to about 300° C. in admixture with 4,4'-diazidodiphenylsulfone.

2. The process of cross-linking an unsaturated hydrocarbon polymer which comprises heating said polymer at a temperature of from about 90° C. to about 300° C. in admixture with 2,2'-dinitro-4,4'-diazidodiphenyl.

References Cited by the Examiner

UNITED STATES PATENTS

| 2,852,379 | 9/1958 | Hepher et al. | 96—91 |
| 2,940,853 | 6/1960 | Sagura et al. | 96—91 |
| 2,983,714 | 5/1961 | Robinson et al. | 260—79.5 |
| 2,985,632 | 5/1961 | Willis | 260—79.5 |
| 3,000,866 | 9/1961 | Tarney | 260—79.5 |
| 3,012,016 | 12/1961 | Kirk et al. | 260—79.5 |
| 3,075,950 | 1/1963 | Newland et al. | 260—66 |
| 3,093,621 | 6/1963 | Gladding | 260—79.5 |
| 3,203,936 | 8/1965 | Breslow et al. | 260—80.7 |

FOREIGN PATENTS 594,393  6/1959  Italy.

JOSEPH L. SCHOFER, *Primary Examiner.*

LEON J. BERCOVITZ, *Examiner.*

M. P. HENDRICKSON, J. A. SEIDLECK,
*Assistant Examiners.*